United States Patent
Naito

(10) Patent No.: US 12,108,145 B2
(45) Date of Patent: Oct. 1, 2024

(54) IMAGE CAPTURING APPARATUS, CONTROL METHOD OF IMAGE CAPTURING APPARATUS, DEVICE, AND CONTROL METHOD OF DEVICE

(71) Applicant: CANON KABUSHIKI KAISHA, Tokyo (JP)

(72) Inventor: Shoko Naito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 17/682,609

(22) Filed: Feb. 28, 2022

(65) Prior Publication Data
US 2022/0279112 A1 Sep. 1, 2022

(30) Foreign Application Priority Data
Mar. 1, 2021 (JP) .................. 2021-032038

(51) Int. Cl.
H04N 23/66 (2023.01)
G01K 3/00 (2006.01)
G01K 13/00 (2021.01)
H04N 23/663 (2023.01)

(52) U.S. Cl.
CPC .......... *H04N 23/663* (2023.01); *G01K 3/005* (2013.01); *G01K 13/00* (2013.01)

(58) Field of Classification Search
CPC ....... H04N 23/663; G01K 3/005; G01K 13/00
See application file for complete search history.

(56) References Cited

U.S. PATENT DOCUMENTS 11,509,800 B2 * 11/2022 Katayama ............... B60R 11/04
2010/0023678 A1 * 1/2010 Nakanishi ............ G11C 16/102
327/512
2022/0279126 A1 * 9/2022 Katsumata ............. H04N 23/52

FOREIGN PATENT DOCUMENTS

JP 2019-183650 A 10/2019

* cited by examiner

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

From a device mounted detachably to the image capturing apparatus, temperature information indicating a temperature in the device is obtained, and, based on the temperature information, an execution frequency of analysis processing executed by the device is controlled.

14 Claims, 8 Drawing Sheets

FIG. 2

IMAGE CAPTURING APPARATUS, CONTROL METHOD OF IMAGE CAPTURING APPARATUS, DEVICE, AND CONTROL METHOD OF DEVICE

BACKGROUND OF THE INVENTION

Field of the Invention

The present invention relates to an operation control technique of a device which is detachably mounted to an image capturing apparatus.

Description of the Related Art

In recent years, image analysis and the like for detection of an object and estimation of an attribute using an image captured by a surveillance camera and the like are being performed. In the past, surveillance camera images have been transferred to a high-performance arithmetic apparatus such as a PC or a server, and the arithmetic apparatus has performed image analysis on the image; however, as the processing capacity of mobile arithmetic apparatuses has improved, image analysis is being increasingly performed on the surveillance camera side. In addition to arranging an arithmetic apparatus in the main body of the surveillance camera, a form in which the arithmetic apparatus is connected to the surveillance camera via a USB or the like has also been proposed as an implementation of this.

In the latter form, the arithmetic apparatus is a "detachable device that is detachably connected to the surveillance camera". The detachable device which is detachably connected to the surveillance camera is often small, and since such a detachable device often uses an arithmetic apparatus capable of sophisticated analysis processing, power consumption with respect to the size of the housing tends to be high. Furthermore, since in recent years, surveillance cameras have become more multi-functional and the power consumption of surveillance cameras themselves is also becoming higher, depending on the use environment, a temperature at which the components used in the surveillance camera and the detachable device are guaranteed to work may be exceeded. In cases where the surveillance camera is not designed assuming that such a detachable device will be mounted, it will not be possible to obtain the temperature around the connector for mounting the detachable device, and normal operation will be performed without detecting whether the temperature at which the components are guaranteed to work is exceeded, which may result in damage to the device.

Japanese Patent Laid-Open No. 2019-183650 discloses that a method of maintaining the device temperature by reducing power consumption by reducing the frequency of a driving clock of an on-board apparatus and lowering the processing speed if the obtained temperature is equal to or higher than a threshold value.

However, in the technique described in Japanese Patent Laid-Open No. 2019-183650, since it is not assumed that temperature information between the devices will be exchanged, cases where the detachable device is mounted on the image capturing apparatus cannot be handled.

SUMMARY OF THE INVENTION

The present invention provides a technique for operating a device that is detachably mounted to an image capturing apparatus within a range where the temperature in the device does not exceed a certain value.

According to the first aspect of the present invention, there is provided an image capturing apparatus, comprising: an obtaining unit configured to obtain, from a device mounted detachably to the image capturing apparatus, temperature information indicating a temperature in the device; and a control unit configured to control, based on the temperature information, an execution frequency of analysis processing executed by the device.

According to the second aspect of the present invention, there is provided a device that is capable of attaching/detaching to/from an image capturing apparatus and that comprises an arithmetic apparatus, the device comprising: an obtaining unit configured to obtain temperature information indicating a temperature in the device; and a control unit configured to control, based on the temperature information, an execution frequency of analysis processing executed by the arithmetic apparatus.

According to the third aspect of the present invention, there is provided a method for controlling an image capturing apparatus, the method comprising: obtaining, from a device mounted detachably to the image capturing apparatus, temperature information indicating a temperature in the device; and controlling, based on the temperature information, an execution frequency of analysis processing executed by the device.

According to the fourth aspect of the present invention, there is provided a method of controlling a device capable of attaching/detaching to/from an image capturing apparatus and that comprises an arithmetic apparatus, the method comprising: obtaining temperature information indicating a temperature in the device; and controlling, based on the temperature information, an execution frequency of analysis processing executed by the arithmetic apparatus.

Further features of the present invention will become apparent from the following description of exemplary embodiments with reference to the attached drawings.

DESCRIPTION OF THE EMBODIMENTS

Figure 1:
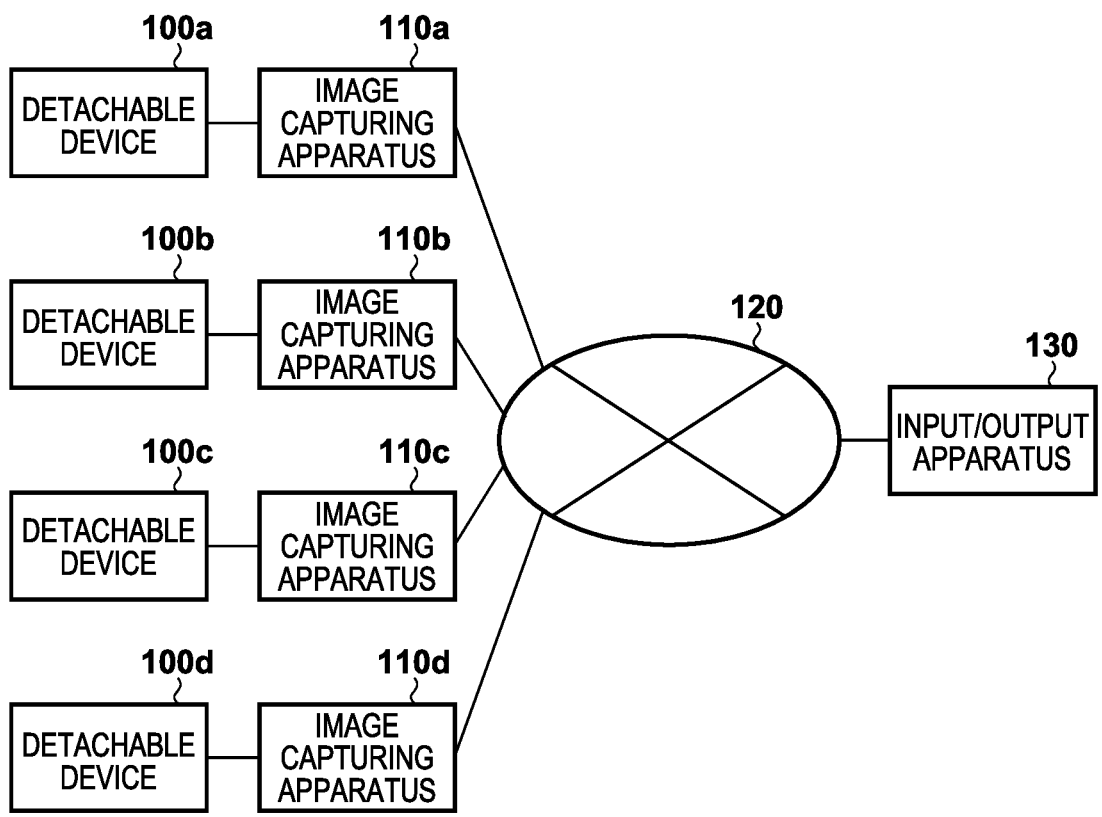
FIG. 1 is a block diagram illustrating a configuration example of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<System Configuration>

First, a configuration example of a system according to the present embodiment is described with reference to the block diagram of FIG. 1. As illustrated in FIG. 1, the system according to the present embodiment includes detachable devices 100a to 100d, image capturing apparatuses 110a to 110d, and an input/output apparatus 130. The image capturing apparatuses 110a to 110d and the input/output apparatus 130 are configured to be capable of mutual data communication via the network 120.

First, the image capturing apparatuses 110a to 110d will be described. The image capturing apparatuses 110a to 110d are image capturing apparatuses such as network cameras, and capture moving images or capture still images periodically or non-periodically. In a case of capturing still images periodically or non-periodically, the image capturing apparatuses 110a to 110d output the still images as captured images. On the other hand, in a case of capturing moving images, the image capturing apparatuses 110a to 110d output an image of each frame in the moving images as a captured image.

In the following description, unless each of the image capturing apparatuses 110a to 110d is distinguished, the image capturing apparatuses 110a to 110d are referred to as the image capturing apparatus 110. That is, the following description of the image capturing apparatus 110 can be applied to each of the image capturing apparatuses 110a to 110d in the same manner.

In the present embodiment, the image capturing apparatus 110 is assumed to have a built-in arithmetic apparatus capable of processing a captured image, but the present invention is not limited thereto. For example, an external computer such as a personal computer (PC) may be connected to the image capturing apparatus 110 as an arithmetic apparatus, and a combination of these may be treated as the image capturing apparatus 110.

Next, the detachable devices 100a to 110d will be described. A detachable device 100x (x=a to d) is an arithmetic apparatus detachable from the image capturing apparatus 110x, stores an image captured by the image capturing apparatus 110x, and performs arithmetic processing including analysis processing on the captured image. For example, in a case where the image capturing apparatus 110x has "a slot in which a device capable of recording a captured image can be attached/detached", the detachable device 100x can be connected to the image capturing apparatus 110x by inserting the detachable device 100x into the slot.

In the following description, the detachable devices 100a to 100d are referred to as the detachable device 100, unless the respective detachable devices 100a to 100d are distinguished. Specifically, the detachable device 100 is a device detachable from the image capturing apparatus 110, and the following description of the detachable device 100 is equally applicable to each of the detachable devices 100a to 100d.

In the detachable device 100, for example, a device having a configuration in which a predetermined processing circuit is mounted on an SD card can be applied. The detachable device 100 may, for example, be configured to be entirely insertable into the image capturing apparatus 110 depending on the form of an SD card, and thereby, the detachable device 100 can be configured to be connectable to the image capturing apparatus 110 without a portion thereof protruding from the image capturing apparatus 110. Thus, it is possible to prevent the detachable device 100 from interfering with an obstacle such as wiring, and it is possible to increase the convenience at the time of use of the device. Also, since an SD card slot is provided in many existing image capturing apparatuses 110 such as network cameras, an extension function can be provided to the existing image capturing apparatus 110 by the detachable device 100. In the present embodiment, the detachable device 100 is described as a device that has a configuration in which a predetermined processing circuit is mounted on an SD card. However, rather than an SD card, the detachable device 100 may be configured to be attached to the image capturing apparatus 110 by any interface used when a storage apparatus capable of recording captured images captured by at least the image capturing apparatus 110 is attached. For example, the detachable device 100 may have a USB interface and be configured to be attached to a USB socket of the image capturing apparatus 110. The predetermined processing circuitry is also implemented, for example, by an FPGA (field programmable gate array) programmed to perform a predetermined process, but may be implemented in other forms. The clocking of the FPGA is generated by a quartz oscillator configured within the detachable device 100. Alternatively, a clock for SD communication may be used.

In the present embodiment, it is assumed that the detachable devices 100 are mounted on all of the four image capturing apparatuses 110 in FIG. 1. However, the system may include an image capturing apparatus 110 to which the detachable device 100 is not connected and is not limited to detachable devices 100 being mounted on all of the image capturing apparatus 110.

By the detachable device 100 having a function (arithmetic processing function) for executing arithmetic processing being mounted to the image capturing apparatus 110, it is possible to obtain the arithmetic processing result for the captured image by the image capturing apparatus 110 even if the image capturing apparatus 110 has no arithmetic processing function.

Further, as in the present embodiment, in the form in which the arithmetic apparatus is disposed in the image capturing apparatus 110, it is possible to diversify/improve image processing that can be executed on the image capturing apparatus 110 side by the detachable device 100, in which the arithmetic apparatus is disposed, being attached to the image capturing apparatus 110.

Next, the input/output apparatus 130 is described. The input/output apparatus 130 is a computer apparatus such as a personal computer (PC), a smart phone, or a tablet terminal apparatus, and displays a captured image transmitted from the image capturing apparatus 110 or accepts input of various instructions from a user.

Next, the network 120 will be described. The network 120, for example, is configured to include a plurality of routers, switches, cables, and the like satisfying a communication standard such as Ethernet (registered trademark). In the present embodiment, the network 120 may be any network that enables communication between the image capturing apparatus 110 and the input/output apparatus 130, and may be constructed to be any size, configuration, or compliant communication standard. For example, the network 120 may be the Internet, a wired LAN (Local Area Network), a wireless LAN, a WAN (Wide Area Network), or the like. The network 120 may also be configured to allow for communication over, for example, an ONVIF (Open Network Video Interface Forum) standard compliant communication protocol. However, the present invention is not limited to this, and the network 120, for example, may be configured to allow communication in other communication protocols such as a unique communication protocol.

<Configuration of Each Apparatus>

(Configuration Example of the Image Capturing Apparatus 110)

Figure 2:
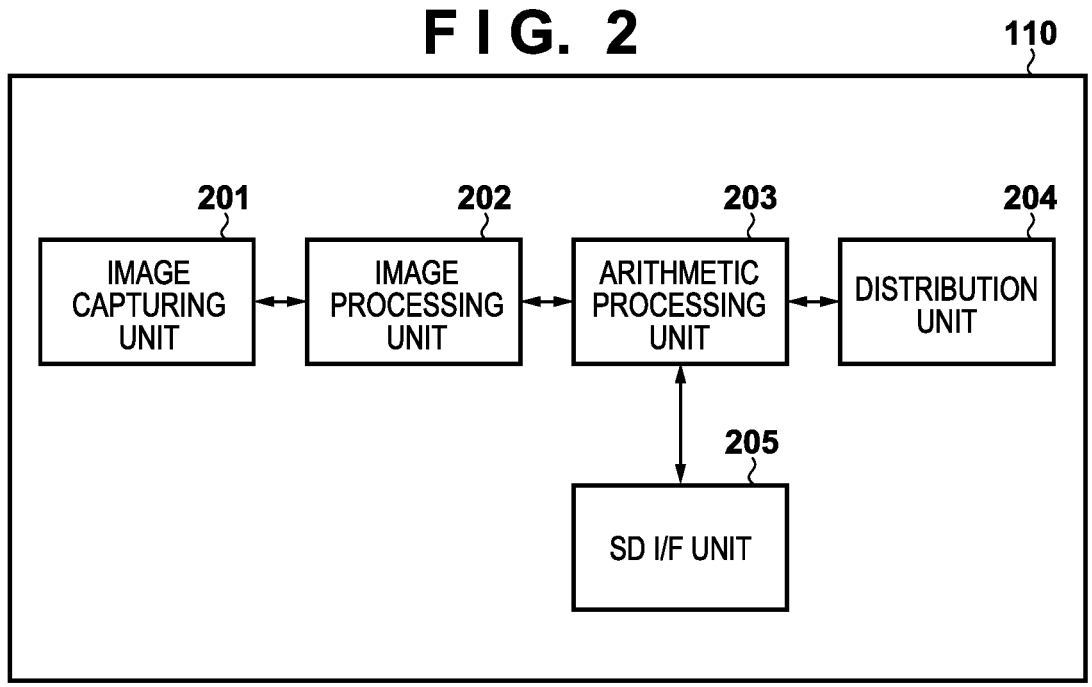
FIG. 2 is a block diagram illustrating an example of a hardware configuration of an image capturing apparatus 110.

An example of a hardware configuration of the image capturing apparatus 110 is described with reference to the block diagram of FIG. 2. Note that FIG. 2 illustrates a main configuration related to the following description, and does not show all the configurations of the image capturing apparatus 110.

An image capturing unit 201 includes a lens unit for focusing light, and an image capturing element for outputting an analog signal corresponding to the light focused by the lens unit. The lens unit has a zoom function for adjusting the angle of view, an aperture function for adjusting the amount of light, and the like. The image capturing element has a gain function for performing sensitivity adjustment when converting light into an analog signal. These functions are adjusted based on setting values output from the image processing unit 202.

An image processing unit 202 includes an A/D converter, an image processing engine, and peripheral devices thereof, and the like, The A/D converter converts the analog signal output from the image capturing unit 201 (image capturing element) into a digital signal. The image processing engine generates a captured image by performing image processing such as development processing, filtering processing, sensor correction, and noise removal on a RAW image represented by the digital signal. Also, the image processing engine may perform exposure adjustment so as to be able to transmit a set value to the lens unit or the image capturing element and obtain a captured image of an appropriate exposure. Peripheral devices include, for example, RAM (Random Access Memory), drivers for each I/F, and the like. The captured image is outputted to an arithmetic processing unit 203 via the peripheral device.

The arithmetic processing unit 203 includes one or more processors such as a CPU or an MPU, a memory such as a RAM or a ROM, a driver for each I/F, and the like. For example, the arithmetic processing unit 203 determines processes to be executed in the image capturing apparatus 110 and processes to he executed in the detachable device 100, and executes the processes determined as processes to be executed in the image capturing apparatus 110. The arithmetic processing unit 203 outputs information necessary for processing determined as processing to be executed in the detachable device 100 to the detachable device 100, and causes the detachable device 100 to execute the processing. The arithmetic processing unit 203 outputs the captured image to a distribution unit 204 and an SD I/F unit 205. Also, in a case where processing is performed on the captured image, the arithmetic processing unit 203 outputs the result of the processing to the distribution unit 204.

The distribution unit 204 includes a network distribution engine and a peripheral device such as a RAM or an ETH PITY module, for example. An ETH PHY module is a module that performs Ethernet physical (PHY) layer processing. The distribution unit 204 converts the captured image and the result of processing output from the arithmetic processing unit 203 into "data in a format that can be distributed to the network 120", and transmits the converted data to the input/output apparatus 130 via the network 120.

An SD I/F unit 205 is an interface for connecting to the detachable device 100, for example, and includes a power supply and a mounting mechanism such as an attachment-detachment socket for attaching and detaching the detachable device 100. Here, it is assumed that the SD I/F unit 205 is configured in accordance with the SD standard established by the SD Association. The image capturing apparatus 110 performs data communication with the detachable device 100 via, the SD I/F unit 205.

Next, an example of a functional configuration of the image capturing apparatus 110 is described with reference to the block diagram of FIG. 3. Functional units shown in FIG. 3 may be implemented as hardware incorporated in any of the functional units shown in FIG. 2, or max be implemented as software executed by any of the functional units shown in FIG. 2.

An image capture control unit 301 performs operation control of the image capturing unit 201; for example, the image capture control unit 301, based on the above set value, performs operation control of the image capturing unit 201 so that the image capturing unit 201 captures the surrounding environment in an appropriate exposure state.

A signal processing unit 302 generates a captured image as described above from the analog signal output from the image capturing unit 201 controlled by the image capture control unit 301. The signal processing unit 302 may encode the generated captured image. When the image capturing unit 201 captures a still image, the signal processing unit 302 encodes the still image using, for example, an encoding method such as JPEG (Joint Photographic Experts Group). When the image capturing unit 201 captures a moving image, the signal processing unit 302 encodes the moving image using an encoding method such as H.264/MPEG-4 AVC (hereinafter referred to as "H.264") or HEVC (High Efficiency Coding). Further, the signal processing unit 302 may perform encoding from among a plurality of preset coding schemes using an encoding scheme selected by the user, for example, through an operation unit (not shown) of the image capturing apparatus 110.

A storage unit 303 stores a list of analysis processes executable by the analysis unit 305 (hereinafter, referred to as a first process list) and a list of processes for post-processing on the results of the analysis processing. The storage unit 303 stores the results of analysis processes performed by the analysis unit 305.

Note, in the present embodiment, the process to be executed is an analysis process, but any process may be executed, and the storage unit 303 stores the first process list and the post-process list for the processes related to the processing to be executed.

Figure 3:
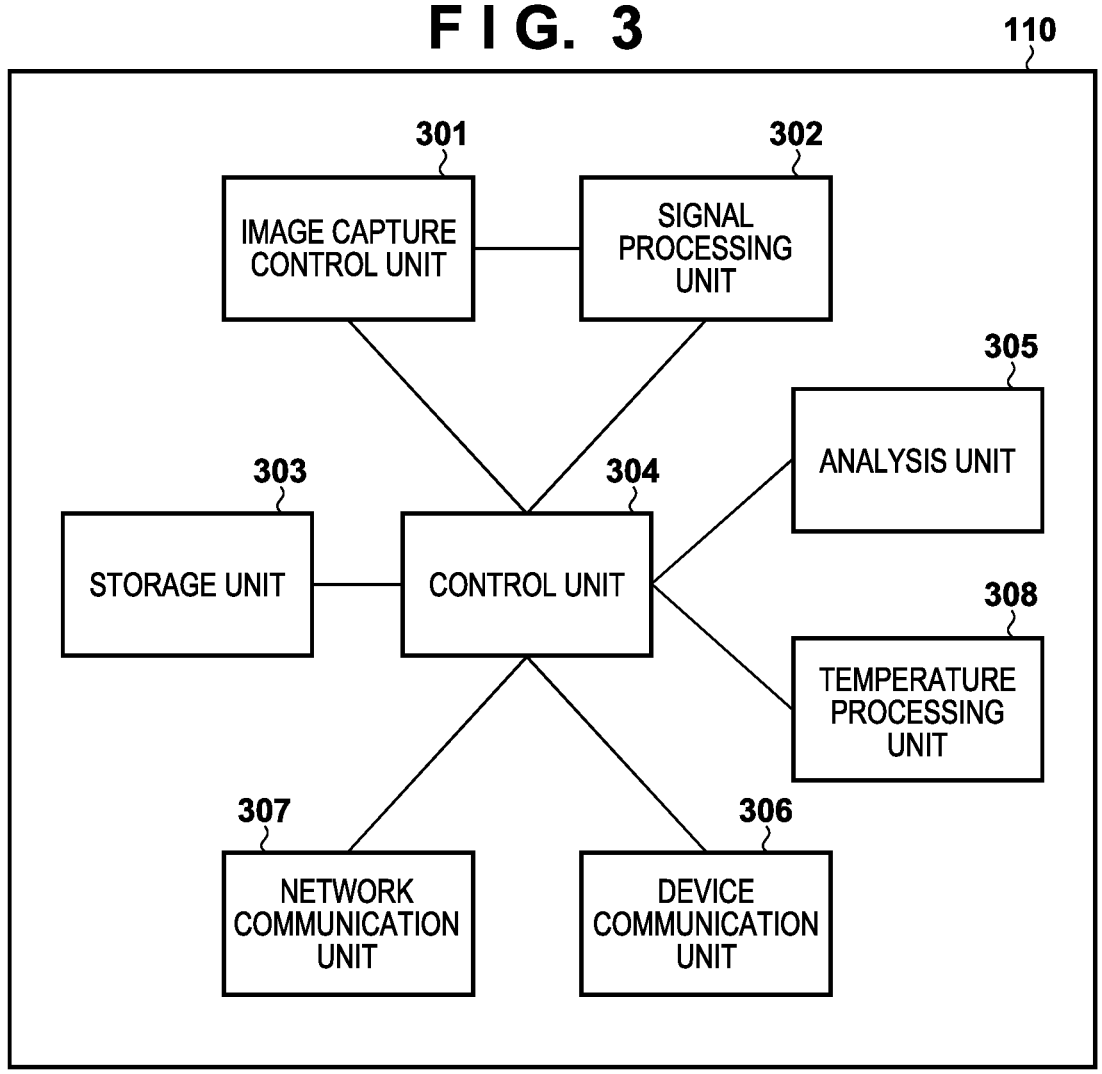
FIG. 3 is a block diagram illustrating an example of a functional configuration of the image capturing apparatus 110.

A control unit 304 performs operation control of the image capturing apparatus 110, and for example, performs operation control of each functional unit illustrated in FIG. 3.

The analysis unit 305 selectively executes at least one of pre-analysis processing, analysis processing, and post-analysis processing on the captured image generated by the signal processing unit 302.

The pre-analysis processing is processing to be executed on the captured image before executing the analysis processing on the captured image. In the pre-analysis processing of the present embodiment, as an example, a process of dividing a captured image and creating a divided image is performed.

The analysis process is a process of outputting information obtained by analyzing an input image. In the analysis processing of the present embodiment, as an example, it is assumed that a divided image obtained by pre-analysis processing is used as an input image, analysis processing such as human body detection processing, face detection processing, and/or vehicle detection processing is performed on the input image, and the result of the analysis processing is output. The analysis processing may be processing configured to output the position of the object in the divided image using a learned machine learning model so that an object included in the image can be detected by, for example, an existing technique.

Post-analysis processing is a process executed after analysis processing is executed. In the post-analysis processing of the present embodiment, as an example, a process of outputting a total of the number of objects detected in each divided image as a "result of the analysis process" is executed based on the result of the analysis processing for each divided image. The analysis process may be a process of detecting an object in an image by performing pattern matching and outputting the position of the object. Hereinafter, these processes (pre-analysis processing, analysis processing, and post-analysis processing) are collectively referred to as analysis processing in some cases.

A temperature processing unit 308 extracts "temperature information indicating the temperature (temperature in the detachable device 100) in the detachable device 100" from the data received from the detachable device 100, and compares the magnitude of the temperature indicated by the temperature information with the threshold value.

In order to reduce the temperature in the image capturing apparatus 110 (temperature in the image capturing apparatus 110) and the temperature in the detachable device 100 if the temperature indicated by the temperature information is equal to or higher than a threshold value, the temperature processing unit 308 performs control for reducing the execution frequency of processing (arithmetic processing) in the detachable device 100. The higher the frequency of execution of the processing, the faster processing can be performed; however, the temperature in the detachable device 100 and the image capturing apparatus 110 power consumption increase by an increase in the processing load. Therefore, in the present embodiment, when the temperature of the detachable device 100 is equal to or higher than the threshold value, by reducing the execution frequency of processing in the detachable device 100, an increase in temperature is prevented.

On the other hand, if the temperature indicated by the temperature information is less than the threshold value, the temperature processing unit 308 performs control for increasing the execution frequency of the processing (arithmetic processing) in the detachable device 100 in accordance with the required execution frequency, or performs control for keeping the execution frequency constant.

The execution frequency of the processing in the detachable device 100 is determined dynamically in accordance with the usage environment at that time by repeating a magnitude comparison between the temperature indicated by the temperature information received from the detachable device 100 and a threshold value, and controlling the execution frequency of the processing according to the results of the magnitude comparison.

Here, in order to reduce the time required for determining the execution frequency of the processing in the detachable device 100 and the load of the processing for the determination, for example, the following configuration may be adopted.

By storing the processing frequency and the temperature of the detachable device 100 for the arithmetic processing currently running in the storage unit 303 and then determining the processing frequency from the information stored when running the arithmetic processing, it is possible to reduce the time and processing for determining the processing frequency by comparing the temperature information and the processing frequency.

In this manner, a table of processing frequencies corresponding to the temperature of the detachable device 100 is stored for each arithmetic process, and the corresponding processing frequencies are determined from the temperature information obtained from the detachable device 100 by using the table.

Here, the method for controlling the execution frequency of the processing in the detachable device 100 by the temperature processing unit 308 is not limited to a specific control method. For example, the frequency of execution of processing in the detachable device 100, may be controlled by changing the operating frequency supplied from the image capturing apparatus 110 (temperature processing unit 308) to the detachable device 100. Specifically, the temperature processing unit 308, by increasing/lowering the operating frequency used in the arithmetic processing in an FPGA 402 to be described later in the detachable device 100, may increase/lower the execution frequency of the processing in the detachable device 100 (the FPGA 402). The temperature processing unit 308, by raising/lowering an SD clock (communication frequency) when using the SD clock as the clock for the arithmetic processing in the FPGA 402, may increase/lower the execution frequency of the processing in the detachable device 100 (FPGA 402).

Further, for example, the temperature processing unit 308 may increase/lower the frequency of execution of the processing in the detachable device 100 (FPGA 402) by increasing/lowering the frequency at which commands for arithmetic processing are supplied (filling/spacing out supply of calculation instructions) to the detachable device 100 (FPGA 402) from the image capturing apparatus 110 (temperature processing unit 308).

The threshold value used for the magnitude comparison described above is set by the temperature processing unit 308 so that the temperature in the image capturing apparatus 110 and the temperature in the detachable device 100 can be controlled to be appropriately maintained. For example, the storage unit 303 stores a temperature which is preset as an upper limit of the temperature in the image capturing apparatus 110 as "temperature upper limit A". The later-described storage unit 404 in the detachable device 100 stores a temperature which is preset as an upper limit of the temperature in the detachable device 100 as "temperature upper limit B". When each of the image capturing apparatus 110 and the detachable device 100 activate and enter a state in which they are capable of data communication with each other, the image capturing apparatus 110 transmits a request for transmission of "temperature upper limit B" to the detachable device 100 and receives the "temperature upper limit B" that the detachable device 100 has transmitted in response to the transmission request. Then, the temperature processing unit 308 performs a magnitude comparison between the "temperature upper limit A" stored in the storage unit 303 and the "temperature upper limit B" received from the detachable device 100, and sets the lower of the "temperature upper limit A" and the "temperature upper limit B" as the threshold value described above.

A device communication unit 306 performs data communication with the detachable device 100 via the SD I/F unit 205. The device communication unit 306 converts transmission data provided as data to be transmitted to the detachable device 100 into transmission data in a format that can be processed by the detachable device 100, and transmits the converted transmission data to the detachable device 100 via the SD I/F unit 205. The device communication unit 306 receives data transmitted from the detachable device 100, and converts the received data into data in a format that can be processed by the image capturing apparatus 110. In the present embodiment, the device communication unit 306 executes a process of converting a decimal number between a floating-point format and a fixed-point format as a conversion process, but the present invention is not limited to this, and other processes may be executed by the device communication unit 306. Also, in the present embodiment, it is assumed that the device communication unit 306 performs communication with the detachable device 100 by transmitting a predetermined command sequence within a range of the SD standard to the detachable device 100 and receiving a response from the detachable device 100. A network communication unit 307 performs data communication with the input/output apparatus 130 via the network 120.

<Example of Configuration of Detachable Device 100>

Figure 4:
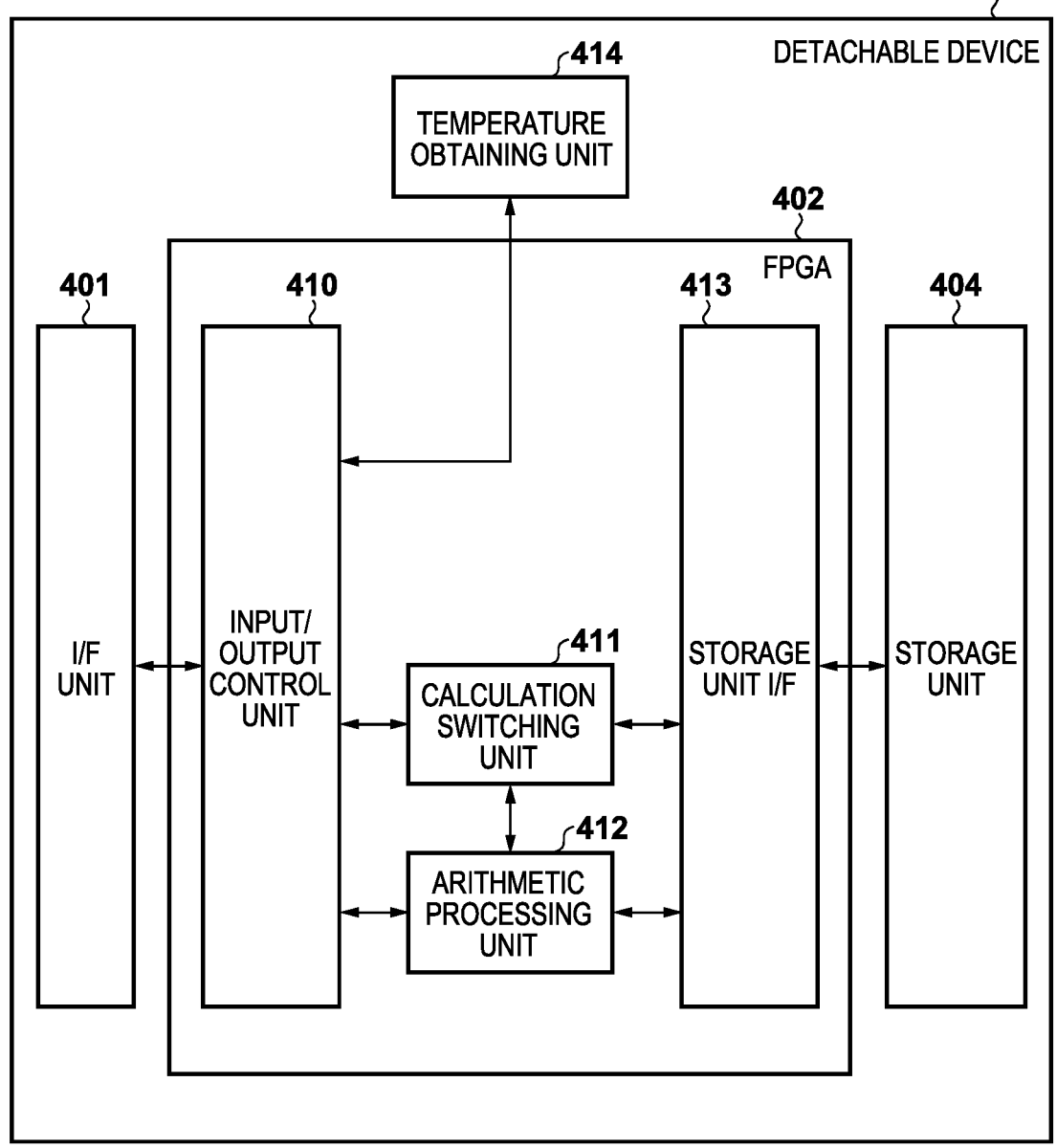
FIG. 4 is a block diagram illustrating an example of a hardware configuration of a detachable device 100.

Next, an example of the hardware configuration of the detachable device 100 is described with reference to the block diagram of FIG. 4. Note that FIG. 4 illustrates a main configuration related to the following description, and does not show all the configurations of the detachable device 100.

The detachable device 100 has an arithmetic apparatus, and the arithmetic apparatus is configured by an FPGA or the like. The detachable device 100 is of a shape that can be the inserted/removed into/from the attachment-detachment socket of the SD I/F unit 205 that the image capturing apparatus 110 has, that is, it is molded in a shape conforming to the SD standard.

An I/F unit 401 is an interface portion for connecting an apparatus such as an image capturing apparatus 110 and the detachable device 100. The I/F unit 401, for example, is configured to include an electrical contact terminal or the like that receives a power supply from the image capturing apparatus 110 and generates and distributes the power supply for use in the detachable device 100. Like the SD I/F unit 205 of the image capturing apparatus 110, the I/F unit 401 complies with items defined in (compliant with) the SD standard. The detachable device 100 receives various data such as a captured image transmitted from the image capturing apparatus 110 via the I/F unit 401. Also, the detachable device 100 transmits the data outputted from FPGA 402 to the image capturing apparatus 110 via the I/F unit 401.

The FPGA 402 is a type of semiconductor device that can repeatedly reconfigure an internal logic circuit structure and, by a process implemented by the FPGA 402, can add (provide) a processing function to the apparatus on which the detachable device 100 is mounted. Also, the FPGA 402 reconfiguration function allows the logic circuit structure to be changed later, so that attaching the detachable device 100 to a type of apparatus for which technology advances rapidly, for example, enables the apparatus to execute the appropriate processing in a timely manner. In the present embodiment, an example in which an FPGA is used will be described, but a general-purpose ASIC or a dedicated LSI may be used, for example, as long as a process described later can be realized. The FPGA 402 is started by the setting data including the information of the logic circuit structure to be generated being written from a dedicated IX, or by setting data being read from the dedicated I/F. In the present embodiment, it is assumed that the setting data is held in the storage unit 404. When the power is turned on, the FPGA 402 reads the setting data from the storage unit 404 and generates and starts the logic circuit. However, the present invention is not limited thereto, and by mounting a dedicated circuit in the detachable device 100, for example, the image capturing apparatus 110 may write the selling data to the FPGA 402 via the I/F unit 401. In the present embodiment, the FPGA 402 performs arithmetic processing on a captured image received from the image capturing apparatus 110 via the Ill unit 401, and outputs the result of the arithmetic processing.

An input/output control unit 410 is configured to include a circuit for controlling transmission/reception of data to/from the image capturing apparatus 110, a circuit for analyzing a command received from the image capturing apparatus 110, and a circuit for performing control based on the result of analysis of a command or the like. Commands are defined in the SD standard, and the input/output control unit 410 can detect some of them. Details of functions will be described later. The input/output control unit 410, after receiving the captured image of the calculation target from the image capturing apparatus 110, outputs the captured image to an arithmetic processing unit 412, After receiving an initialization sequence and a reconfiguration command from the image capturing apparatus 110, the input/output control unit 410 outputs the initialization sequence and the reconfiguration command to the temperature obtaining unit 414. Further, the input/output control unit 410, after receiving the setting data of the switching of the processing from the image capturing apparatus 110, outputs the setting data to a calculation switching unit 411.

The calculation switching unit 411 is configured to include a circuit that, based on the setting data received from the image capturing apparatus 110, obtains, from the storage unit 404, information of arithmetic processing functions including processing for analyzing a captured image, and writes that information to arithmetic processing unit 412. The information is, for example, a setting parameter indicating the order and type of calculations to be processed in the arithmetic processing unit 412, calculation coefficients, and the like.

The arithmetic processing unit 412 is configured to include a plurality of arithmetic circuits necessary for executing the analysis processing for the captured image. The arithmetic processing unit 412 executes various arithmetic processing based on the information received from the calculation switching unit 411, transmits the result of the arithmetic processing to the input/output control unit 410, and stores the result in the storage unit 404.

In this manner, the FPGA 402 extracts the setting data of the processing function to be executed, which is included in the setting data corresponding to the plurality of processing functions held in advance, and rewrites the processing content executed by the arithmetic processing unit 412 based on the extracted setting data. As a result, the detachable device 100 can selectively execute at least one of the plurality of processing functions. Further, by adding the setting data of the process to be newly added as needed, the latest process can be executed on the image capturing apparatus 110 side. In the following, having a plurality of setting data corresponding to each of the plurality of processing functions is expressed as having a plurality of processing functions. That is, even when the FPGA 402 of the detachable device 100 is configured to execute one processing function, when it is possible to change the processing content of the arithmetic processing unit 412 by the setting data for another processing function, it is expressed as having a plurality of processing functions.

A storage unit I/F 413 is configured to include a circuit that converts the format of the received data into a protocol suitable for the storage unit 404 and. transmits and receives data. The storage unit I/F 413 supports some of commands corresponding to respective memory standards, and transmits/receives data (reads and writes data to/from the storage unit 404) to/from the respective components and the storage unit 404.

The storage unit 404 may be a non-volatile memory such as a flash memory or a DRAM, a volatile memory, or a plurality of memories including both of these. The storage unit 404 stores various types of information such as data transmitted from the image capturing apparatus 110, information of a function of arithmetic processing, and a result of arithmetic processing.

The temperature obtaining unit 414 includes "a temperature sensor that is provided outside of the FPGA 402 and that is for measuring the temperature in the detachable device 100" and "a generating unit that is for generating temperature information indicating a temperature measured by the temperature sensor". The temperature obtaining unit 414 outputs the temperature information generated by the generating unit to the input/output control unit 410.

The input/output control unit 410 generates transmission data including a result of the arithmetic processing outputted from the arithmetic processing unit 412 and temperature information outputted from the temperature obtaining unit 414. and transmits the generated transmission data to the image capturing apparatus 110.

Here, an example of a method of generating transmission data including a result of arithmetic processing and temperature information will be described. Firstly, the temperature information is data on the order of 1 byte. On the other hand, the data length of the result of the arithmetic processing is defined as 512 bytes for one block because, for example, in the case of the SD protocol, data exchange must be performed in units of blocks. Therefore, even if the result of arithmetic processing is less than 512 bytes of data, it is necessary to send the 512 bytes that is one block of data. For example, when the result of the arithmetic process is 500 bytes of data, the remaining 12 bytes of data is unnecessary (free) data, and therefore, 1 byte or so of the temperature information is transmitted using the free 12 bytes of data. In this way, communication of temperature information becomes unnecessary, and data can be efficiently transferred between apparatuses. Further, in the case of the same operation processing type, the data amount of the result of the operation processing is the same each time. Therefore, since the image capturing apparatus 110 can ascertain where the temperature information is from in the result of arithmetic processing in the transmission data of one block transmitted from the detachable device 100, it can extract the temperature information from the transmission data.

Figure 5:
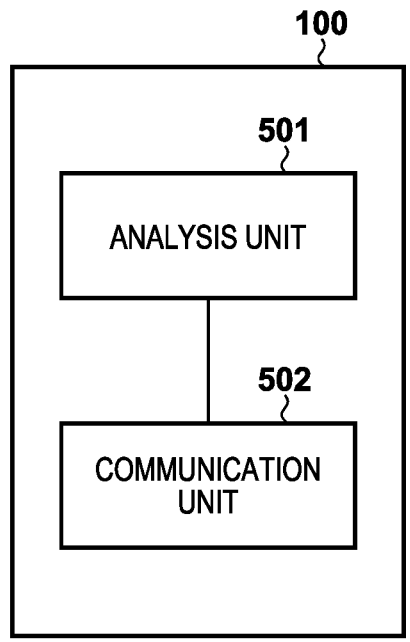
FIG. 5 is a block diagram illustrating an example of a functional configuration of the detachable device 100.

Next, an example of a functional configuration of the detachable device 100 is described with reference to the block diagram of FIG. 5. Functional units shown in FIG. 5 may be implemented as hardware incorporated in any of the functional units shown in FIG. 4, or may be implemented as software executed by any of the functional units shown in FIG. 4.

The analysis unit 501 executes various arithmetic processes including analysis processing on the captured image received from the image capturing apparatus 110. For example, when receiving a setting request for an analysis process, the analysis unit 501 executes a setting for making the analysis process executable. Further, the analysis unit 501, after receiving a captured image and an arithmetic processing command, executes the arithmetic processing including analysis processing that is set to be executable on the captured image. In the present embodiment, the executable analysis processing is assumed to be human body detection processing and face detection processing, but the present invention is not limited to these. For example, the processing may be for determining whether a person stored in advance is included in the captured image (later-described face authentication processing). Further, for example, it may be a process of calculating a degree of coincidence between an image feature amount of a person stored in advance and an image feature amount of a person detected from an inputted captured image, and determining that the person was stored in advance when the degree of coincidence is equal to or greater than a threshold value. For example, for the purpose of privacy protection, a predetermined mask image may be superimposed onto a person detected in an inputted captured image, or mosaic processing may be performed for a person detected in an inputted captured image. Further, for example, processing for detecting whether or not a person in a captured image is performing a specific action by using a learning model in which a specific action of a person is learned by machine learning. Also, the executable analysis processing may be a process of determining what kind of region the region in the captured image is, for example. Also, the executable analysis processing may be processing for using a learning model in which a building, a road, a person, the sky, or the like is learned by machine learning to determine what kind of region a region within a captured image is, for example.

As described above, the executable analysis processing can be applied to analysis processing using the machine learning or analysis processing not using the machine learning. The above analysis processes are not limited to being performed by the detachable device 100 alone, and may be performed in cooperation with the image capturing apparatus 110, A communication unit 502 controls data communication with the image capturing apparatus 110 via the I/F unit 401.

(Configuration Example of the Input/Output Apparatus 130)

Figure 6:
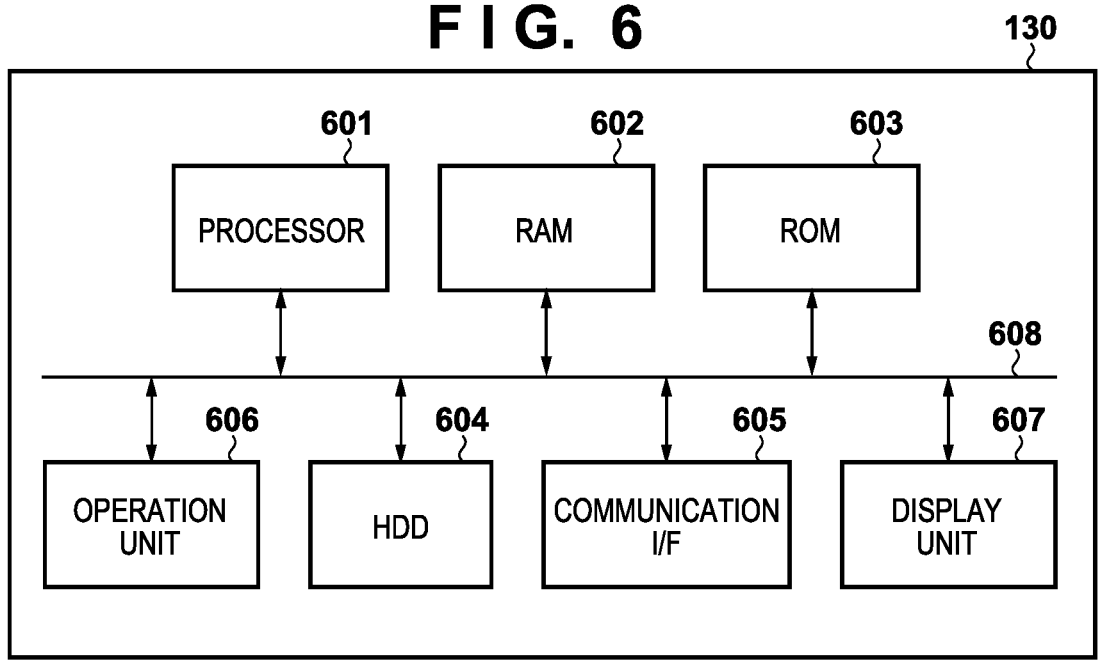
FIG. 6 is a block diagram illustrating an example of a hardware configuration of an input/output apparatus 130.

Next, an example of the hardware configuration of the input/output apparatus 130 is described with reference to the block diagram of FIG. 6. Note that FIG. 6 illustrates a main configuration related to the following description, and does not show all the configurations of the input/output apparatus 130.

A processor 601 is a processor such as a CPU, an MPU, or a GPU, and executes various kinds of processing using a computer program or data stored in a RAM 602 or a ROM 603. As a result, the processor 601 controls the operation of the entire the input/output apparatus 130, and executes or controls each of the types of process described as being performed by the input/output apparatus 130.

The RAM 602 includes an area for storing computer programs and data loaded from a ROM 603 or an HDD (hard disk drive) 604, and an area for storing data received from the image capturing apparatus 110 via a communication I/F 605. The RAM 602 also includes a work area used by the processor 601 to execute various processing. In this manner, the RAM 602 can appropriately provide various areas.

The ROM 603 stores setting data of the input/output apparatus 130, a computer program and data related to activation of the input/output apparatus 130, a computer program and data related to basic operation of the input/output apparatus 130, and the like.

The HDD 604 stores an operating system (OS), computer programs for causing the processor 601 to execute various kinds of processes described performed by the input/output apparatus 130, data, and the like. Computer programs and data stored in the HDD 604 are loaded into the RAM 602 as appropriate in accordance with the control of the processor 601 and are processed by the processor 601.

The communication I/F 605 is a communication interface for connecting the input/output apparatus 130 to the above-described network 120. and the input/output apparatus 130 performs data communication with the image capturing apparatus 110 on the network 120 via a communication I/F 605.

An operation unit 606 is a user interface such as a keyboard, a mouse, or a touch panel, and can input various instructions to the processor 601 when operated by a user.

A display unit 607 has a liquid crystal screen or a touch panel screen, and displays a result of processing by the processor 601 in the form of an image, text, or the like. The display unit 607 may be a projection apparatus such as a projector for projecting an image or text.

The processor 601, the RAM 602, the ROM 603, the HDD 604, the communication I/F 605, the operating unit 606, and the display unit 607 are all connected to a system bus 608, In the configuration of FIG. 6, the method of presenting the information to the user is display by the display unit 607, but the method of presenting the information to the user is not limited to a specific presentation method, and the presentation of information may instead or additionally be performed by voice or vibration.

The input of instructions and information to the input/output apparatus 130 may be by voice input, or may be by gesture input (a gesture by the user is recognized and an instruction or information corresponding to the recognized gesture is input). That is, the method of inputting information to the input/output apparatus 130 is not limited to a specific input method.

Figure 7:
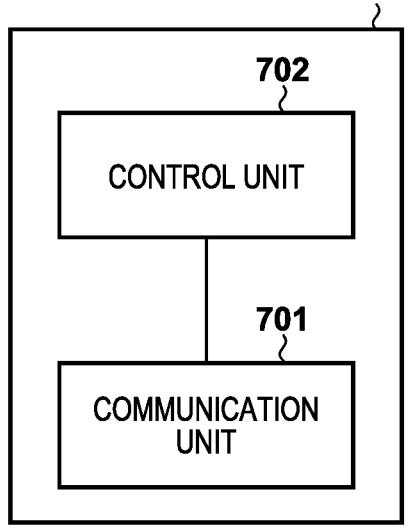
FIG. 7 is a block diagram illustrating an example of a functional configuration of the input/output apparatus 130.

Next, an example of a functional configuration of the input/output apparatus 130 is described with reference to the block diagram of FIG. 7. The functional portion shown in FIG. 7 may be implemented as hardware or as software. In the latter case, the software is stored in an HDD 604, loaded into RAM 602 as needed, and executed by the processor 601.

A communication unit 701 controls the communication I/F 605 and performs data communication with the image capturing apparatus 110 via the network 120. It should be noted that this is merely an example, and for example, the communication unit 701 may be configured to establish a direct connection with the image capturing apparatus 110 and communicate with the image capturing apparatus 110 without going through the network 120 or other apparatuses. The control unit 702 performs operation control of the input/output apparatus 130.

<Flow of Processing in System>

Figure 8:
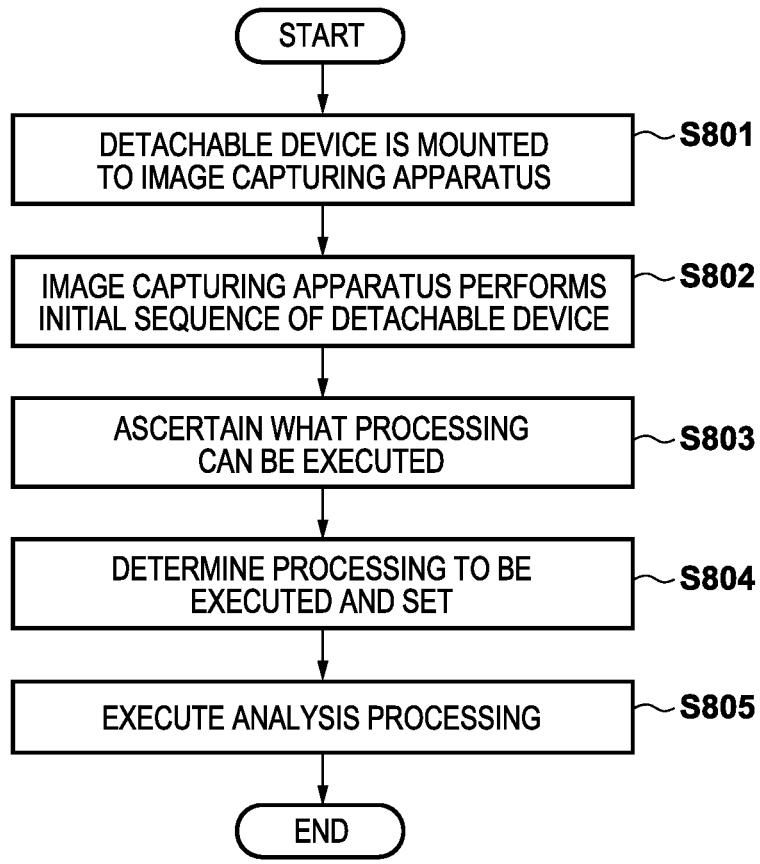
FIG. 8 is a flowchart illustrating an outline of an operation of the system.

Next, an outline of the operation of the system according to the present embodiment will be described with reference to the flowchart of FIG. 8. Processing according to the flowchart of FIG. 8 is started when it is detected by communication between the image capturing apparatus 110 and the detachable device 100 (the method of detection is not limited thereto) that the detachable device 100 is mounted to the image capturing apparatus 110.

First, in step S801, the user mounts the detachable device 100 to the image capturing apparatus 110. In step S802, the arithmetic processing unit 203 executes an initialization sequence of the detachable device 100. In this initialization sequence, when a predetermined command is transmitted/received between the image capturing apparatus 110 and the detachable device 100, the image capturing apparatus 110 enters a state in which the detachable device 100 is usable.

In step S803, the arithmetic processing unit 203 ascertains what processing the detachable device 100 can execute from the above list stored in the storage unit 303, and ascertains what processing can be executed by the image capturing apparatus 110 on its own or by the image capturing apparatus 110 in combination with the detachable device 100. The detachable device 100 may be configured to be capable of executing any processing, but processing unrelated to processing to be executed on the image capturing apparatus 110 side need not be considered, In one example, the image capturing apparatus 110 retains a "list of processes that may be performed" obtained in advance from, for example, the input/output apparatus 130. In this case, when the information indicating the processing that can be executed by the detachable device 100 is obtained from the detachable device 100, it is possible for the image capturing apparatus 110 to ascertain only the processing that can be executed according to whether or not the processing is included in the list.

Next, in step S804, the arithmetic processing unit 203 determines processing to be executed, and executes setting of the detachable device 100 as required, That is, when at least a part of processing determined to be an execution target is executed by the detachable device 100, a setting of the detachable device 100 for the processing is executed. In this setting, for example, the FPGA 402 can be reconfigured using setting data corresponding to the process to be executed, Next, in step S805, the arithmetic processing unit 203 and/or the arithmetic processing unit 412 executes the analysis processing (pre-analysis processing, analysis processing, post-analysis processing) and arithmetic processing.

The processing of FIG. 8 is executed, for example, when the detachable device 100 is mounted on the image capturing apparatus 110. However, at least a part of the processing of FIG. 8 may be repeatedly executed, such as when the processing of step S803 is executed again when the detachable device 100 is detached from the image capturing apparatus 110.

Figure 9:
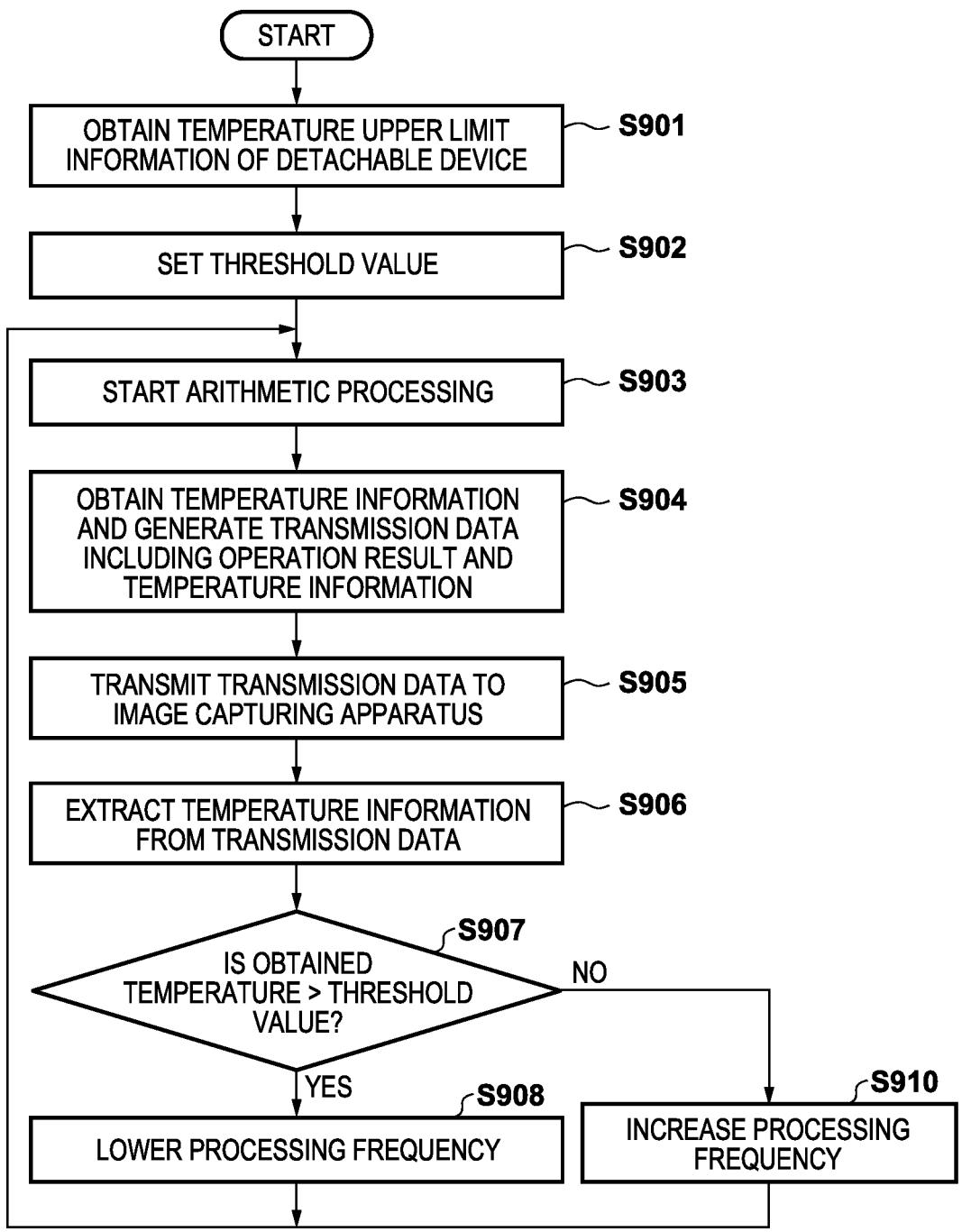
FIG. 9 is a flowchart relating to processing for controlling the execution frequency in the processing in the detachable device 100 according to the temperature in the detachable device 100.

Next, the flowchart of FIG. 9 is used to describe a portion of the processing described in FIG. 8 related to processing for controlling execution frequency of processing in the detachable device 100 in accordance with the temperature in the detachable device 100. Processing according to the flowchart of FIG. 9 is started when the power is supplied to the image capturing apparatus 110, the data communication between the image capturing apparatus 110 and the detachable device 100 becomes possible, and the detachable device 100 has entered a state in which it can perform the arithmetic processing.

In step S901, the control unit 304 controls the device communication unit 306 to request the detachable device 100 to transmit temperature upper limit information indicating a temperature rise in the detachable device 100. The input/output control unit 410 of the detachable device 100 receives the request, obtains the temperature upper limit information indicating the temperature rise in the detachable device 100 stored in the storage unit 404, and transmits the obtained temperature upper limit information via the I/F unit 401 to the image capturing apparatus 110. The control unit 304 obtains the temperature upper limit information transmitted from the detachable device 100 via the device communication unit 306.

In step S902, the control unit 304 reads the temperature upper limit information indicating the temperature upper limit in the image capturing apparatus 110 stored in the storage unit 303. The temperature processing unit 308 performs a magnitude comparison between the "temperature upper limit B in the detachable device 100" that the temperature upper limit information that the control unit 304 obtained from the detachable device 100 indicates and the "temperature upper limit A in the image capturing apparatus 110" that temperature upper limit information that the control unit 304 read from the storage unit 303 indicates. The temperature processing unit 308 sets the lower one of the "temperature upper limit A" and the "temperature upper limit B" as a threshold value.

In step S903, the control unit 304 transmits the captured image and a command for arithmetic processing on the captured image to the detachable device 100 via the device communication unit 306. The arithmetic processing unit 412 in the detachable device 100 performs arithmetic processing for the captured image based on the captured image and a command of the arithmetic processing obtained via the I/F unit 401 and the input/output control unit 410.

In step S904, the temperature obtaining unit 414 generates temperature information indicating the measured "temperature in the detachable device 100", The input/output control unit 410 generates transmission data including the generated temperature information, and the result of the arithmetic processing in step S903. In step S905, the input/output control unit 410 transmits the transmission data generated in step S904 to the image capturing apparatus 110 via the I/F unit 401.

In step S906, the control unit 304 receives the transmission data transmitted from the detachable device 100 via the device communication unit 306, and the temperature processing unit 308 extracts temperature information from the received transmission data. The analysis unit 305 extracts the result of the arithmetic processing from the received transmission data, and performs analysis processing on the captured image using the extracted result of the arithmetic processing.

In step S907, the temperature processing unit 308 determines whether or not the temperature indicated by the temperature information extracted from the transmission data in step S906 is greater than the threshold value set in step S902. When the result of this determination is that the temperature indicated by the temperature information extracted from the transmission data in step S906 is equal to or higher than the threshold value set in step S902, the process proceeds to step S908. On the other hand, when the temperature indicated by the temperature information extracted from the transmission data in step S906 is less than the threshold value set in step S902, the process proceeds to step S910.

In step S908, the temperature processing unit 308, in order to reduce the temperature in the image capturing apparatus 110 and the detachable device 100, performs control to reduce the execution frequency of the processing (arithmetic processing) in the detachable device 100. For example, the temperature processing unit 308 controls to reduce the frequency at which captured images and arithmetic processing commands are transmitted in step S903. In step S908. in addition to or in place of such control, it is possible to control to reduce the operating frequency used in the arithmetic processing in the FPGA 402 in the detachable device 100. Then, the process proceeds to step S903.

In step S910, the temperature processing unit 308, in order to increase the temperature in the image capturing apparatus 110 and the detachable device 100, performs control to increase the frequency of execution of processing (arithmetic processing) in the detachable device 100. For example, the temperature processing unit 308 controls to increase frequency at which captured images and arithmetic processing commands are transmitted in step S903. In step S910, in addition to or in place of such control, it is possible to control to increase the operating frequency used in the arithmetic processing in the FPGA 402 in the detachable device 100. Then, the process proceeds to step S903.

Note that in the case where the temperature indicated by the temperature information extracted from the transmission data in step S906 is less than the threshold value set in step S902, the processing proceeds to step S903 without the processing of step S910 being performed.

Such processing allows the temperature state of the detachable device 100 to be regularly monitored to operate the detachable device 100 within a range where the temperature of the image capturing apparatus 110 and the detachable device 100 does not reach or exceed a certain amount.

<First Variation>

Examples of the agent of each process described above are not limited to this and, for example, when dedicated hardware is mounted on the image capturing apparatus 110 or the detachable device 100, the hardware may execute some or all of the above-described processes.

<Second Variation>

As a control method for lowering the temperature in the image capturing apparatus 110, it is possible to adopt the following configuration. For example, a fan for lowering the temperature of the hardware in the image capturing apparatus 110 may be provided in the image capturing apparatus 110, and the temperature processing unit 308 may stop the fan in step S910 and operate the fan (rotate the fan) in step S908. Further, the temperature processing unit 308 may rotate the fan at a rotational speed P (P □ 0) in step S910, and rotate the fan at a rotational speed Q (Q>P) in step S908.

Further, in step S908, the image capturing apparatus 110 may issue a warning so that the user adjusts whether another function of the image capturing apparatus 110 operates. For example, the LED of the image capturing apparatus 110 may be caused to blink/light up, and an image or characters indicating a warning may be caused to be displayed on the display screen of the image capturing apparatus 110.

Thus, according to the present embodiment, within a scope where the temperature in the image capturing apparatus 110 and the detachable device 100 is not a certain temperature or higher, it is possible to operate the detachable device 100 and the image capturing apparatus 110.

Second Embodiment

In the present embodiment, a difference from the first embodiment will be described, and the present embodiment is assumed to be the same as the first embodiment unless specifically mentioned below. In the first embodiment, the operation control of the detachable device 100 based on the temperature in the detachable device 100 is performed by the image capturing apparatus 110, but in the present embodiment, such control is performed in the detachable device 100.

An example of the hardware configuration of the detachable device 100 according to the present embodiment is described with reference to the block diagram of FIG. 10. In the first embodiment, the image capturing apparatus 110 includes the temperature processing unit 308, but in the present embodiment, the image capturing apparatus 110 does not include the temperature processing unit 308, and instead, the detachable device 100 includes the temperature processing unit 415.

When the temperature processing unit 415 enters a state in which the detachable device 100 and the image capturing apparatus 110 can communicate, the temperature upper limit information indicating the "temperature upper limit A in the image capturing apparatus 110" is obtained from the image capturing apparatus 110 (storage unit 303). Also, the temperature processing unit 415 performs a magnitude comparison between a "temperature upper limit B in the detachable device 100" indicated by the temperature upper limit information stored in the storage unit 404 and a "temperature upper limit A in the image capturing apparatus 110" indicated by the temperature upper limit information obtained from the image capturing apparatus 110. The temperature processing unit 415 sets the lower one of the "temperature upper limit A" and the "temperature upper limit B" as a threshold value.

The temperature processing unit 415 determines whether or not the temperature indicated by the temperature information obtained by the temperature obtaining unit 414 is equal to or greater than the threshold value. As a result of this determination, if the temperature indicated by the temperature information obtained by the temperature obtaining unit 414 is equal to or higher than the threshold value, the temperature processing unit 415, in order to reduce the temperature in the image capturing apparatus 110 and the detachable device 100, performs control for reducing the execution frequency of processing in the detachable device 100. For example, the temperature processing unit 415 drops the frequency of an IP for performing the arithmetic processing of FPGA 402 to lower the operating frequency in the detachable device 100. Meanwhile, if the temperature indicated by the temperature information obtained by the temperature obtaining unit 414 is less than the threshold value, the temperature processing unit 415, in order to increase the temperature in the image capturing apparatus 110 and the detachable device 100, performs control for increasing the execution frequency of processing in the detachable device 100. If the temperature indicated by the temperature information obtained by the temperature obtaining unit 414 is less than the threshold value, the temperature processing unit 415 may perform control for keeping the execution frequency of processing in the detachable device 100 constant.

Note that the storage unit 404 may have a work memory such as a DRAM for arithmetic processing, and the FPGA 402 may have a configuration by which it can control the frequency of communication with DRAM and the operating frequency of DRAM itself. In this case, if the temperature indicated by the temperature information obtained by the temperature obtaining unit 414 is equal to or greater than the threshold value, or the frequency of access to DRAM is reduced, it is possible to reduce the load of the arithmetic processing by reducing the operating frequency of DRAM. This allows the detachable device 100 to operate within a range where the temperature in the detachable device 100 does not become a certain temperature or higher.

Figure 10:
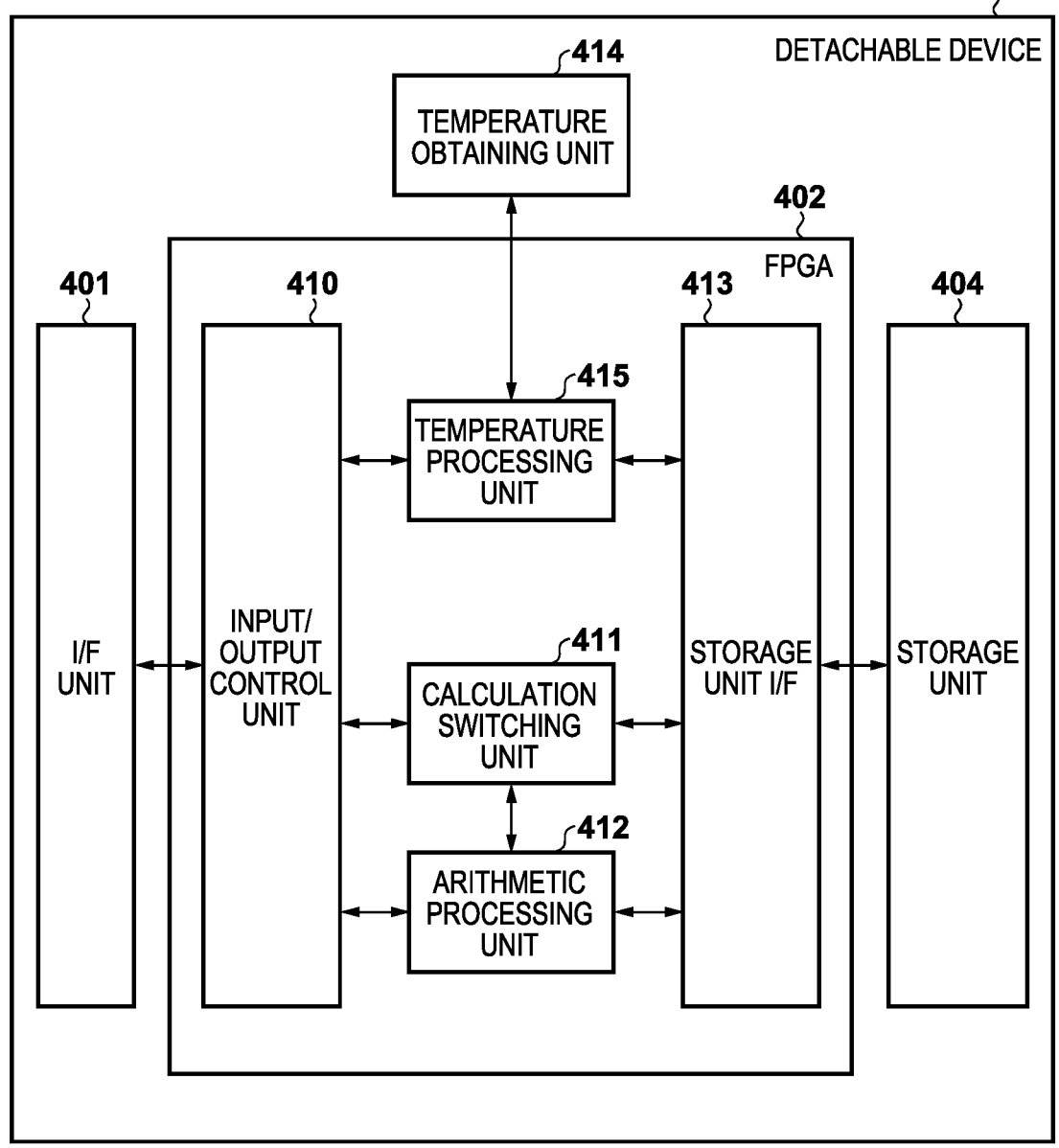
FIG. 10 is a block diagram illustrating an example of a hardware configuration of the detachable device 100.
Figure 11:
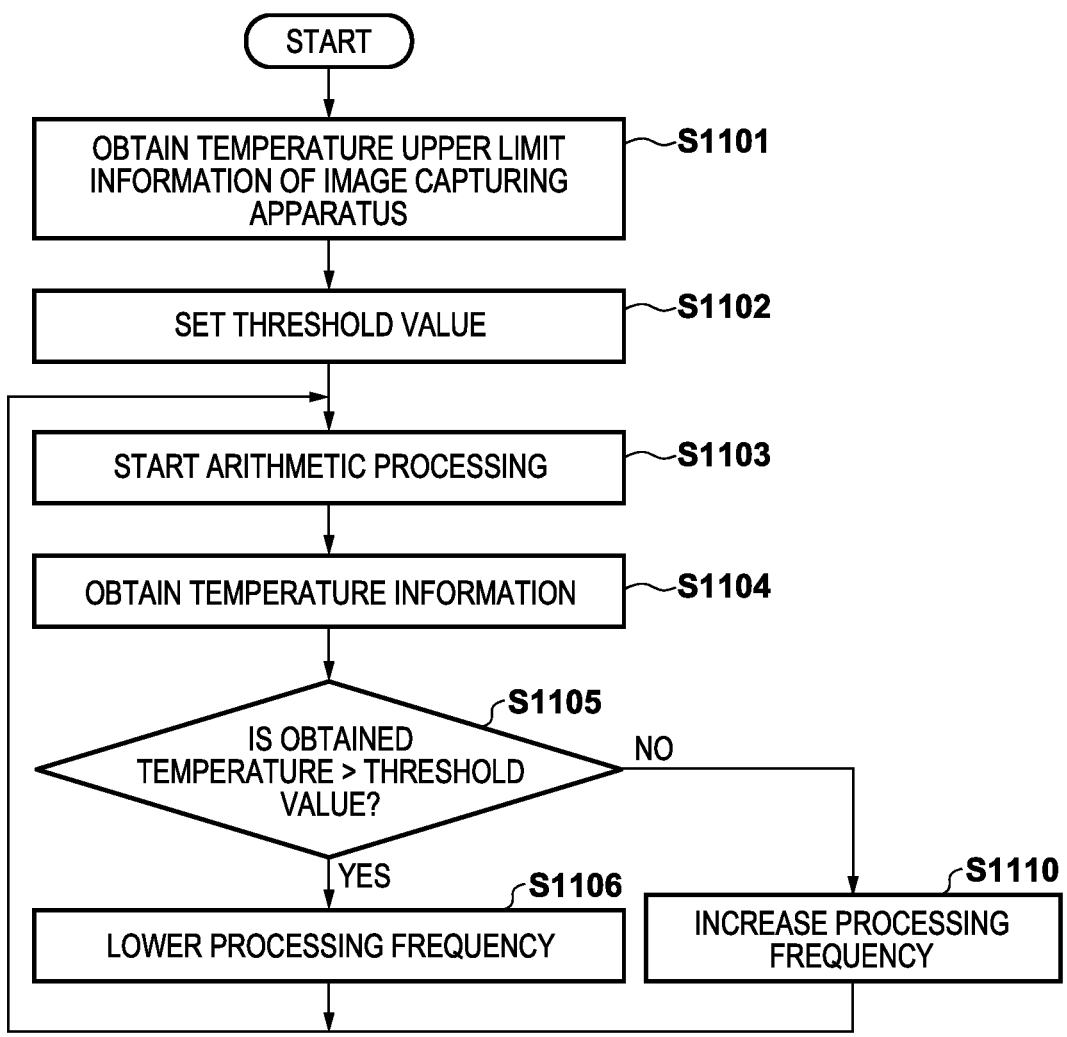
FIG. 11 is a flowchart relating to processing for controlling the execution frequency in the processing in the detachable device 100 according to the temperature in the detachable device 100.

Next, the flowchart of FIG. 10 is used to describe a portion of the processing described in FIG. 8 related to processing for controlling execution frequency of processing in the detachable device 100 in accordance with the temperature in the detachable device 100. Processing according to the flowchart of FIG. 10 is started when the power is supplied to the image capturing apparatus 110, the data communication between the image capturing apparatus 110 and the detachable device 100 becomes possible, and the detachable device 100 has entered a state in which it can perform the arithmetic processing.

In step S1101, the input/output control unit 410 makes a request to the image capturing apparatus 110 for transmission of temperature upper limit information indicating a temperature rise in the image capturing apparatus 110. When the control unit 304 in the image capturing apparatus 110 receives the request, the control unit 304 obtains "temperature upper limit information indicating a temperature rise in the image capturing apparatus 110" stored in the storage unit 303, and transmits the obtained temperature upper limit information to the detachable device 100 via the device communication unit 306. The input/output control unit 410 receives the temperature upper limit information transmitted from the image capturing apparatus 110 via the I/F unit 401.

In step S1102, the temperature processing unit 415 reads the "temperature upper limit information indicating the temperature upper limit in the detachable device 100" stored in the storage unit 404. Also, the temperature processing unit 415 performs a magnitude comparison between the "temperature upper limit B in the detachable device 100" indicated by the temperature upper limit information read from the storage unit 404 and the "temperature upper limit A in the image capturing apparatus 110" indicated by the temperature upper limit information received from the image capturing apparatus 110. The temperature processing unit 415 sets the lower one of the "temperature upper limit A" and the "temperature upper limit B" as a threshold value.

Step S1103 is the same as that of the above step S903, and therefore the explanation thereof is omitted. In step S1104, the temperature obtaining unit 414 generates temperature information indicating the measured "temperature in the detachable device 100".

In step S1105, the temperature processing unit 415 determines whether or not the temperature indicated by the temperature information generated in step S1104 is greater than the threshold value set in step S1102. When the result of this determination is that the temperature indicated by the temperature information generated in step S1104 is equal to or higher than the threshold value set in step S1102, the processing proceeds to step S1106. On the other hand, when the temperature indicated by the temperature information generated in step S1104 is less than the threshold value set in step S1102, the processing proceeds to step S1110.

In step S1106, the temperature processing unit 415, in order to reduce the temperature in the image capturing apparatus 110 and the detachable device 100, performs control to reduce the execution frequency of the processing (arithmetic processing) in the detachable device 100. Since the content of the control is the same as that of the first embodiment (similar to the above step S908), explanation thereof is omitted.

In step S1110, the temperature processing unit 415, in order to increase the temperature in the image capturing apparatus 110 and the detachable device 100, performs control to increase the execution frequency of the processing (arithmetic processing) in the detachable device 100. Since the content of the control is similar to that of the first embodiment (similar to the above step S910), explanation thereof is omitted.

Note that similarly to the first embodiment, when the temperature indicated by the temperature information generated in step S1104 is less than the threshold value set in step S1102, the processing may proceed to step S1103 without performing the processing in step S1110.

In this manner, according to the present embodiment, it possible to regularly monitor the temperature state of the detachable device 100 to operate the detachable device 100 within a range where the temperature of the image capturing apparatus 110 and the detachable device 100 does not reach or exceed a certain amount.

In each of the above-described embodiments and variations, a system for analyzing the number, location, and the like of objects in a captured image has been described as an example. However, the respective embodiments and variations described above are similarly applicable to other applications of the system (such as a system for performing some analysis processing on the captured image by the image capturing apparatus 110).

The numerical values, the processing timing, the processing order, the agent of the processing, the configuration/transmission destination/transmission source/storage location etc. of data (information) used in respective embodiments and variations described above are given as an example for the purpose of concrete description, and there is no intention to limit the invention to such examples.

In addition, some or all of the above-described embodiments and variations may be used in combination as appropriate. In addition, some or all of the respective above-described embodiments and variations may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-032038, tiled Mar. 1, 2021, which is hereby incorporated by reference herein in its entirety.

What is claimed is:

1. An image capturing apparatus including a mounting part capable of attaching/detaching a detachable device, comprising:
    one or more processors; and
    one or more memories storing executable instructions which, when executed by the one or more processors, cause the image capturing apparatus to perform operations including:
    obtaining, from the detachable device mounted detachably to the image capturing apparatus, first information indicating a temperature upper limit in the detachable device;
    obtaining second information indicating a temperature upper limit in the image capturing apparatus, and setting as a threshold value the lower of the temperature upper limit that the first information indicates and the temperature upper limit that the second information indicates;
    transmitting to the detachable device a command for an analysis processing on an image captured by the image capturing apparatus, wherein the analysis processing being executed by the detachable device;
    obtaining a result of the analysis processing performed by the detachable device in accordance with the command and a temperature information from the detachable device; and
    controlling, based on the temperature information, an execution frequency of the analysis processing, wherein control for reducing the execution frequency is performed in a case where temperature that the temperature information indicates is equal to or higher than the threshold value, and
    wherein control for increasing the execution frequency is performed in a case where the temperature that the temperature information indicates is less than the threshold value.

2. The image capturing apparatus according to claim 1, wherein in a case where the temperature that the temperature information indicates is less than the threshold value, control for maintaining the execution frequency at a constant frequency is performed.

3. The image capturing apparatus according to claim 1, wherein the execution frequency is controlled by controlling an operating frequency of the detachable device.

4. The image capturing apparatus according to claim 1, wherein the execution frequency is controlled by controlling a frequency at which a command for the analysis processing is transmitted to the detachable device.

5. The image capturing apparatus according to claim 1, wherein, based on the temperature information, rotation of a fan used to lower a temperature of hardware of the image capturing apparatus is controlled.

6. The image capturing apparatus according to claim 1, wherein the temperature information indicating the temperature in the detachable device measured by a sensor provided in the detachable device is obtained from the detachable device.

7. The image capturing apparatus according to claim 1, wherein
the detachable device comprises an arithmetic apparatus configured to execute predetermined analysis processing, and
execution of the analysis processing executed by the arithmetic apparatus that the detachable device comprises is controlled.

8. The image capturing apparatus according to claim 1, wherein the analysis processing is at least one of human body detection processing, face detection processing, and vehicle detection processing on an input image.

9. A detachable device that is capable of attaching/detaching to/from an image capturing apparatus and that comprises an arithmetic apparatus, the detachable device comprising:
a processing circuit; and
a memory storing executable instructions which, when executed by the processing circuit, cause the detachable device to perform operations including
obtaining first information indicating a temperature upper limit in the detachable device, wherein it is set as a threshold value the lower of the temperature upper limit that the first information indicates and a temperature upper limit that a second information indicates, wherein the second information indicates the temperature upper limit in the image capturing apparatus;
receiving a command for an analysis processing on an image captured by the image capturing apparatus from the image capturing apparatus,
executing the analysis processing;
transmitting to the image capturing apparatus a result of analysis processing in accordance with the command and a temperature information in the detachable device; and
controlling, based on the temperature information, an execution frequency of analysis processing, wherein control for reducing the execution frequency is performed in a case where the temperature that the temperature information indicates is equal to or higher than the threshold value, and wherein control for increasing the execution frequency is performed in a case where the temperature that the temperature information indicates is less than the threshold value.

10. A method for controlling an image capturing apparatus including a mounting part capable of attaching/detaching a detachable device, the method comprising:
obtaining, from the detachable device mounted detachably to the image capturing apparatus, first information indicating a temperature upper limit in the detachable device;
obtaining second information indicating a temperature upper limit in the image capturing apparatus, and setting as a threshold value the lower of the temperature upper limit that the first information indicates and the temperature upper limit that the second information indicates;
transmitting to the detachable device a command for an analysis processing on an image captured by the image capturing apparatus, wherein the analysis processing being executed by the detachable device;
obtaining a result of the analysis processing performed by the detachable device in accordance with the command and a temperature information from the detachable device; and
controlling, based on the temperature information, an execution frequency of the analysis processing, wherein control for reducing the execution frequency is performed in a case where temperature that the temperature information indicates is equal to or higher than the threshold value, and
wherein control for increasing the execution frequency is performed in a case where the temperature that the temperature information indicates is less than the threshold value.

11. A method of controlling a detachable device capable of attaching/detaching to/from an image capturing apparatus and that comprises an arithmetic apparatus, the method comprising:
obtaining first information indicating a temperature upper limit in the detachable device, wherein it is set as a threshold value the lower of the temperature upper limit that the first information indicates and a temperature upper limit that a second information indicates, wherein the second information indicates the temperature upper limit in the image capturing apparatus;
receiving a command for an analysis processing on an image captured by the image capturing apparatus from the image capturing apparatus,
executing the analysis processing;
transmitting to the image capturing apparatus a result of analysis processing in accordance with the command and a temperature information in the detachable device; and
controlling, based on the temperature information, an execution frequency of analysis processing, wherein control for reducing the execution frequency is performed in a case where the temperature that the temperature information indicates is equal to or higher than the threshold value, and wherein control for increasing the execution frequency is performed in a case where the temperature that the temperature information indicates is less than the threshold value.

12. The image capturing apparatus according to claim 1, wherein the detachable device is a SD card.

13. The image capturing apparatus according to claim 9, wherein the detachable device is a SD card.

14. An image capturing apparatus including a mounting part capable of attaching/detaching a detachable device, comprising:
one or more processors; and
one or more memories storing executable instructions which, when executed by the one or more processors, cause the image capturing apparatus to perform operations including:
obtaining, from the detachable device mounted detachably to the image capturing apparatus, temperature information indicating a temperature in the detachable device; and
controlling, based on the temperature information, an execution frequency of analysis processing on an image captured by the image capturing apparatus and rotation of a fan used to lower a temperature of hardware of the image capturing apparatus, the analysis processing being executed by the detachable device, wherein control for reducing the execution frequency is performed and the fan is rotated by first speed, in a case where the temperature that the temperature information indicates is equal to or higher than the threshold value, and wherein control for increasing the execution frequency is performed and the fan is rotated by second speed that is slower than the first speed, in a case where the temperature that the temperature information indicates is less than the threshold value.

* * * * *